United States Patent [19]

McDougald

[11] Patent Number: 5,476,584
[45] Date of Patent: Dec. 19, 1995

[54] BACKWASH/REWASH TRAVELING BRIDGE FILTER AND RELATED PROCESS

[75] Inventor: Mack McDougald, Ochlocknee, Ga.

[73] Assignee: Davis Water & Waste Industries, Inc., Thomasville, Ga.

[21] Appl. No.: 136,030

[22] Filed: Oct. 14, 1993

[51] Int. Cl.⁶ .................................................. B01D 24/46
[52] U.S. Cl. .......................... 210/108; 210/102; 210/106; 210/264; 210/269; 210/271; 210/275; 210/791; 210/793; 210/134
[58] Field of Search ..................................... 210/791, 106, 210/108, 264, 265, 269, 271, 107, 275, 793, 134, 138, 411, 98, 102

[56] References Cited

U.S. PATENT DOCUMENTS

| | | | |
|---|---|---|---|
| Re. 28,458 | 7/1975 | Ross | 210/274 |
| 2,302,449 | 11/1942 | Laughlin | 210/275 |
| 2,302,450 | 11/1942 | Laughlin | 210/275 |
| 2,679,319 | 5/1954 | Walker | 210/130 |
| 2,679,319 | 5/1954 | Walker . | |
| 3,239,061 | 3/1966 | Horning et al. . | |
| 3,533,507 | 10/1970 | Aitken | 210/274 |
| 3,907,686 | 9/1975 | Fletcher et al. | 210/340 |
| 3,984,326 | 10/1976 | Bendel | 210/264 |
| 4,082,664 | 4/1978 | Lindstol | 210/277 |
| 4,133,766 | 1/1979 | Adie | 210/275 |
| 4,152,265 | 5/1979 | Meyers | 210/275 |
| 4,235,718 | 11/1980 | Lopez | 210/278 |
| 4,308,141 | 12/1981 | Clendenen | 210/264 |
| 4,454,034 | 6/1984 | Astrom et al. | 210/264 |
| 4,537,687 | 8/1985 | Piper | 210/275 |
| 4,540,487 | 9/1985 | Johnson et al. | 210/264 |
| 4,617,131 | 10/1986 | Walker | 210/794 |
| 4,659,462 | 4/1987 | Chapman | 210/266 |
| 4,764,288 | 8/1988 | Walker et al. | 210/793 |
| 4,765,889 | 8/1988 | Grujanac | 210/276 |
| 4,859,330 | 8/1989 | Pauwels | 210/264 |
| 5,089,117 | 2/1992 | Nichols | 210/264 |
| 5,137,645 | 8/1992 | Miller | 210/793 |
| 5,147,560 | 9/1992 | Nichols | 210/275 |
| 5,288,398 | 2/1994 | Angelino | 210/793 |

FOREIGN PATENT DOCUMENTS

| | | |
|---|---|---|
| 2252118 | 6/1975 | France . |
| 868139 | 5/1961 | United Kingdom . |

*Primary Examiner*—Ana M. Fortuna
*Attorney, Agent, or Firm*—Nixon & Vanderhye

[57] ABSTRACT

A method of cleaning a filtration tank having a plurality of side-by-side gravity flow filter cells, each having an outlet port in communication with a filtrate channel common to all of the cells in an automatic backwash/rewash system, by subjecting each compartment, sequentially, to a backwashing operation and then a rewashing operation wherein, during backwashing, backwash liquid is pumped through a first of the filter chamber ports to flow upwardly through a first of the compartments in a direction opposite to a normal filtration flow direction, and during rewashing, rewash liquid is drawn downwardly through the first cell in the normal filtration flow direction. For any given cell after a first of the plurality of cells, utilizing at least a portion of the rewash liquid from a rearwardly adjacent filter cell is used as backwash liquid in the given cell. In addition, a backwash/rewash shoe is slidable along the tank such that a backwash head and a rewash head of the shoe are continuously sealingly engageable with a pair of adjacent outlet ports. Related apparatus is also disclosed.

16 Claims, 3 Drawing Sheets

BACKWASH/REWASH TRAVELING BRIDGE FILTER AND RELATED PROCESS

The present invention relates to a traveling bridge filter system and more specifically, to a combined backwash/rewash system and related process for periodic cleaning of individual filter cells within a larger filtration basin.

BACKGROUND AND SUMMARY OF THE INVENTION

It is by now well known in the water filtration field to utilize filtration tanks divided into a plurality of filter cells, one adjacent the other, and all containing a multi-layer or single layer arrangement of granular filter media such as sand, gravel and the like. In downward or gravity filtration systems of this type, water or other liquid containing suspended solid particles is introduced into the filtration tank from above, and clarified water is drawn off from a chamber (also referred to herein as a filtrate channel) either directly beneath, or adjacent and below the individual filter cells. In other words, in some instances, a common filtrate chamber extends beneath all of the filter bed cells. In other instances, the cell partitions extend below the cells to the bottom wall of the tank, and each individual cell has a port which permits the filtrate to flow out of the cell and into a common filtrate channel extending along side the tank.

During downward flow through the individual cells, particulate matter is entrapped within the layer or layers of granular filter media, but eventually, the particulate matter clogs the filter media, thereby impairing the filtering capability of the system. Thus, there is a need for periodic cleaning of the individual filter cells, typically by way of a backwash operation where filtered liquid is reverse flowed through the filter cells, one after the other, until the entire tank has been backwashed. It is also known to maintain such units in continuous operation during cleaning of individual cells, through the use of a traveling bridge device which moves from one filter cell to the next, backwashing individual cells while permitting the normal filtration process to continue in the remaining cells.

Examples of travelling bridge apparatus of this type may be found in U.S. Pat. Nos. 5,089,117; 4,988,439; 4,957,631; 4,859,330; 4,764,288; 4,617,131; 4,540,487; 4,486,307; 4,133,766; 3,984,326; 2,235,227; and 2,302,449. Typically, travelling bridge systems include an overhead carriage movable along tracks, guideways or the like, and carrying a backwash hood which may successively engage (or come into close proximity to) the open upper end of each filter cell. For a downflow or gravity type filter, after the backwash hood has been located in the prescribed manner, water or other previously filtered treatment liquid is generally introduced by a backwash pump into the cell from below, in a counterflow arrangement to the normal filtering direction. The backwash hood typically includes a suction head (i.e., a waste water pump) for drawing out fluid and debris flushed out of the filter cell as a result of the backwash. As the backwash of individual cells is completed, the travelling bridge moves to the next adjacent cell.

It is also known to combine backwash and rewash operations in a single traveling bridge system, and examples of this arrangement may be found in U.S. Pat. Nos. 4,540,487; 4,617,131; 4,764,288; and 5,089,117. In a rewash operation, water or other rewash liquid is passed through the filter media in the normal filtering direction, usually immediately after backwash.

The overall construction of the filtration tank of this invention is generally similar to that described in commonly owned U.S. Pat. No. 4,859,330, incorporated herein by reference. In that patent, a backwash/air scour system is disclosed, but the general arrangement of the tank, filter cells or compartments, and traveling bridge is similar. The present invention represents an improvement over the prior art backwash/rewash systems in that a single backwash pump located within the filtrate channel is utilized in combination with a cell shoe which incorporates both backwash and rewash heads. Moreover, both the backwash head and the rewash head of the sealing shoe are designed to continuously seal with the individual cell ports (referred to as backwash or rewash ports, depending on the operation) of the respective filter cells. At the same time, the backwash collection hood is also adapted to seal with adjacent partitions which define an individual cell. The ability to preclude contamination of the filtrate within the filtrate channel by reason of the sealing engagement of the shoe at the respective ports is important (particularly during rewash).

Another significant feature of this invention is the utilization of rewash liquid in the backwash of the cell adjacent and downstream (in the direction of movement of the bridge) of the cell being rewashed.

In an exemplary embodiment, the system includes a tank divided into a plurality of cells, each of which includes filter media supported above the bottom of the tank, such that filtrate below the filter media can drain into a common filtrate channel via individual outlet ports. The associated traveling bridge includes a collection hood which is adapted to seal against the partitions forming each cell, and serves to carry away the backwash water flowing upwardly through the cell during backwash. The bridge also carries a backwash pump which is submerged within the adjacent filtrate channel, and which supplies backwash water to each cell. The construction described immediately above is fairly conventional, noting the above identified prior U.S. patent documents. In a preferred arrangement in accordance with this invention, the submersible backwash pump is mounted in the adjacent filtrate (or effluent) channel to pressurize the filter cell plenum, and a backwash/rewash cell shoe mechanism segregates and seals the cells to be backwashed and rewashed from the filtrate channel, thereby preventing contamination of the filtrate in the channel while maintaining positive flow control.

Generally, during backwash, the traveling bridge will travel from its rest position until the backwash port on the shoe aligns with a first filter cell port. The backwash or collection hood is then sealed to the upper edges of the cell, and the cell is then backwashed for a preset length of time, with filtrate from the filtrate channel pumped into the cell in a direction counter to the normal filtration flow direction. Backwash liquid is removed via the collection hood. The bridge will then move to the next cell where the backwash head on the shoe is aligned with a next adjacent, or second cell port. At this time, the port of the first (already backwashed) cell will be aligned with the rewash head on the shoe. The bridge will remain in place until the backwash and rewash functions are completed on the second and first adjacent cells, respectively. Once the bridge has reached the second cell, rewash water is combined with filtrate channel liquid for backwashing, and both operations may be carried out simultaneously (or sequentially if desired). The bridge will then travel to the next or third cell, where backwash and rewash operations are carried out in the third and second cells, respectively. This procedure is repeated until each cell in the tank has been backwashed and rewashed.

More specifically, in the exemplary embodiment, the backwash/rewash shoe is equipped with a first sealing face which slides against and seals to a liner strip running the length of the tank and overlapping the filter cell outlet ports. Continuous sealing is accomplished by the shoe sealing face being kept in contact with the liner strip during the entire process by means of positive tension forcing the shoe against the liner strip, thereby eliminating leakage. This sealing of the shoe to the cell ports may be achieved through suitable conventional techniques.

In a simple, one-way system, a backwash supply valve is located in the conduit extending between the effluent channel and the inlet to the backwash pump. At the same time, the outlet line of the backwash pump is connected to the backwash head of the backwash/rewash shoe, with a backwash valve inserted between the pump outlet and the backwash port inlet (adjacent the filter cell outlet). Once the traveling bridge is in place, backwash is initiated by opening both the backwash supply valve and the backwash valve to create a path for backwash water to be pumped from the filtrate channel through the filter cell into the backwash hood and then to waste. When backwash is completed for this cell, the backwash supply valve and the backwash valve will close.

A rewash valve is located in the backwash pump outlet line beyond the branch containing the backwash valve. In the rewash mode, the recently backwashed cell is flushed in the normal downflow direction to remove any residual, suspended or particulate material such as bacteria or virus that may be left in the filter bed after backwashing. This is accomplished by a flow path created by the rewash head on the shoe being connected to the backwash pump suction. Since the rewash head of the shoe is connected to the pump suction, flow through the cell under rewash will exit through the backwash port and into the backwash pump and will be expelled with the backwash water during backwash of the adjacent downstream cell.

Thus, in accordance with the invention, since the backwash/rewash cell shoe includes both rewash and backwash heads adapted to align with adjacent cell ports or outlets, a trailing adjacent cell is rewashed during the backwash of the succeeding cell (in the direction of movement of the bridge), with rewash liquid from the trailing cell used as a component of the backwash liquid (along with filtrate from the filtrate channel) in the leading cell. Backwash and rewash on adjacent cells can also occur sequentially rather than simultaneously if desired.

It is recognized that rewash cycles can require more time than backwash cycles, and therefore, provisions must be made to handle the rewash water separately. In accordance with this invention, a valving arrangement is provided so that rewash liquid can be diverted around the cell which is being simultaneously backwashed. The diverted rewash can be recycled to the influent channel or to waste.

In a variation of the system in accordance with the invention, rewash heads are provided on either side of a backwash head in the backwash/rewash shoe, thus enabling the backwash/rewash operations to be carried out with the bridge moving in either of two opposite directions.

Accordingly, in one aspect, the invention relates to a method of cleaning a plurality of side-by-side gravity flow filter cells, each having an outlet port in communication with a filtrate channel common to all of the cells in an automatic backwash/rewash system, comprising the steps of subjecting each compartment, sequentially, to a backwashing operation and then a rewashing operation utilizing a backwash/rewash shoe having adjacent backwash and rewash heads therein slidably movable along the cells and sequentially and sealingly engageable with each outlet port wherein, during backwashing, a backwash pump causes backwash liquid to flow through the backwash head and a first of the filter cell ports and then upwardly through a first of the cells in a direction opposite to a normal filtration flow direction, and wherein during rewashing, rewash liquid is drawn downwardly through the first cell in the normal filtration flow direction through said rewash head, and then to said backwash pump; and for any given cell after a first of the plurality of cells, utilizing at least a portion of the rewash liquid from a rearwardly adjacent filter cell as backwash liquid in the given cell.

In another aspect, the invention relates to an apparatus for cleaning a filtration tank having a plurality of side-by-side gravity flow filter cells, each having an outlet port in communication with a filtrate channel common to all of the cells in an automatic backwash/rewash system, by subjecting each compartment, sequentially, to a backwashing operation and then a rewashing operation, the apparatus comprising a backwash pump utilized to pump backwash liquid through a first of the filter chamber ports to flow upwardly through a first of the compartments in a direction opposite to a normal filtration flow direction; and a backwash/rewash shoe including a backwash head and a rewash head each adapted for respective sealing engagement with a pair of adjacent outlet ports, the rewash head connected to an inlet of the backwash pump, and the backwash head connected to an outlet of the backwash pump.

Other objects and advantages of the invention will become apparent from the detailed description which follows.

DETAILED DESCRIPTION OF THE DRAWINGS

Figure 1:
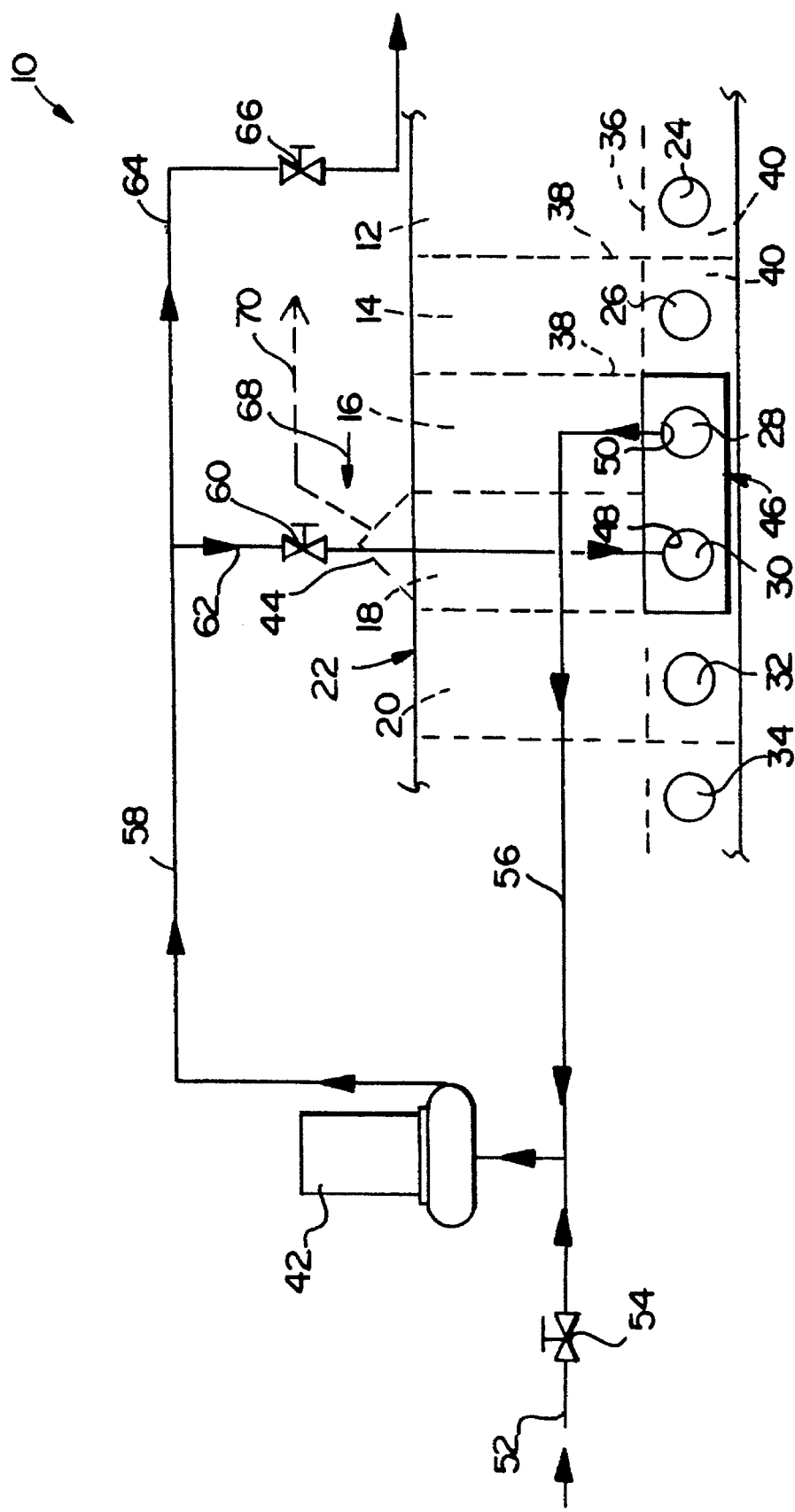
FIG. 1 is a schematic diagram illustrating a backwash/rewash system in accordance with a first embodiment of the invention including a flow diagram in association with a multi-celled filtration tank.

With reference to FIG. 1, there is shown a block or flow diagram relating to the improved traveling bridge filter system 10 in accordance with this invention. The filter tank, individual cell layout and bridge construction is generally similar to that described in commonly owned U.S. Pat. No. 4,859,330, and includes a series of side-by-side filter cells 12, 14, 16, 18, 20, etc. within a tank 22. Each cell has a corresponding outlet port 24, 26, 28, 30, 32, 34, etc., respectively, located beneath the cell media support (represented by reference numeral 36) and opening into a common filtrate channel 37 adjacent the tank 22. The only significant structural distinction in terms of cell lay-out in this case as compared to the tank set-up in the '330 patent is that the individual cell dividers 38 are extended to the tank floor, creating sealed plenum areas 40 under each cell, with individual ports 24, 26, etc., communicating with the adjacent filtration channel. Each cell will then discharge its filtrate through a respective port in the tank wall below the filter media (in the plenum areas 40) to the side mounted filtrate channel 37 and will, in turn, receive its backwash water in the same manner. This arrangement is also similar to that described in U.S. Pat. No. 4,540,487.

A backwash pump 42, preferably a submersible pump, is suspended from the traveling bridge (represented by the hood 44) and is submerged within the side mounted effluent channel for movement with the bridge. At the same time, a backwash/rewash sealing shoe 46 is also supported from the bridge and is movable along the tank side wall to effect a water tight seal between two adjacent outlet ports (28 and 30 in the illustration). The sealing shoe 46 includes a backwash head 48 and a rewash head 50 which function in the manner described hereinbelow.

With further regard to the sealing shoe 46, both the backwash head 48 and the rewash head 50 are equipped with flat sealing faces which slide against and seal to a liner strip running the length of the filter and overlapping the filter cell outlet ports. Sealing is accomplished by keeping the sealing shoe in contact with the liner strip by means of positive tension, forcing the sealing shoe against the liner strip and thereby eliminating leakage. The specific manner in which the backwash/rewash shoe is sealed to the tank side wall as it moves along the tank may be chosen in accordance with conventional techniques for sealing a backwash shoe during backwash. It is significant here that both the backwash head 48 and the rewash head 50 are continuously sealed, for reasons stated further herein.

As described above, during a normal filtering operation, influent flows downwardly through the individual filter cells 12, 14, 16, 18, 20, etc. under the influence of gravity and filtered water flows into the side mounted effluent channel by means of respective cell ports 24, 26, 28, 30, 32, etc.

With this arrangement, effluent from the filtrate channel may be drawn into the inlet of pump 42 by means of conduit 52 under the control of a backwash supply valve 54. The rewash head 50 also communicates with the backwash pump inlet by means of conduit 56.

The outlet of backwash pump 42 communicates with the backwash head 48 by means of conduit 58 as controlled by the backwash valve 60 in a branch conduit 62. Conduit 58 also communicates with a rewash conduit 64, which includes a rewash valve 66.

For purposes of the discussion below, the direction of travel of the traveling bridge is assumed to be in the direction indicated by the arrow 68.

Generally, upon initiation of a backwash operation, the traveling bridge will travel from a rest position in the direction of arrow 68 until the backwash head 48 on the sealing shoe 46 aligns with the first filter cell port 24, where the traveling bridge will stop. With the hood 44 sealed to the cell partitions 38, the cell will be backwashed for a preset length of time. After backwash is over, the bridge will travel until the backwash head 48 on the sealing shoe 46 is aligned with cell port 26 of cell 14. At this time, the cell port 24 for cell 12 will be aligned with the rewash head 50 on the sealing shoe 46. The bridge will then remain in place, with hood 44 sealed to cell 14, until the backwash and rewash functions are completed on the respective cells 14 and 12. The bridge will then continue to index, one cell at a time, repeating the backwash and rewash operations until the entire filter bed has been cleaned. As described in more detail below, it is a feature of this invention that at least part of the backwash liquid for one cell be composed of rewash liquid from an adjacent upstream cell. During initial backwash of the first tank cell, however, it will be appreciated that no rewash liquid is available, and all backwash liquid for this first cell will come from the filtrate channel 37. After backwash of the first cell, however, subsequent backwash operations for the remaining cells may utilize part of the rewash liquid of the adjacent upstream (already backwashed) cell.

More specifically, and as illustrated in FIG. 1, the sealing shoe 46 is shown in a position where the backwash head 48 of shoe 46 is aligned with the cell port 30, and the rewash head 50 of shoe 46 is aligned with the cell port 28. When backwash is initiated, the backwash supply valve 54 and the backwash valve 60 will open, thereby creating a path for a major portion of the backwash water to be pumped (via pump 42) from the filtrate channel 37 via conduit 52, through the pump 42 and through the cell port 30, thus causing the backwash liquid to flow upwardly through the filter bed and into the backwash hood 44. From the hood 44, the backwash liquid is discharged to waste via conduit 70. As mentioned previously, during the backwash operation, the backwash hood 44, which is suspended for up and down movement from the traveling bridge, seals to the upper edges of the cell 18 (as described in the '330 patent, for example), thus preventing any leakage of backwash liquid into the tank. When backwash is complete for cell 18 represented by port 30, the backwash supply valve 54 and the backwash valve 60 will close, simultaneously with the opening of rewash valve 46.

In the rewash mode, the recently backwashed cell is flushed in a downflow mode, to remove any residual suspended or particulate material that may be left in the filter bed after backwashing. This is accomplished by a flow path created by connecting the rewash head 50 of the sealing shoe 46 to the suction inlet of the backwash pump 42 via conduit 56. Thus, rewash liquid flows downwardly by gravity through the filter cell 16 through outlet port 28 and rewash head 50 and into the inlet of backwash pump 42 by means of conduit 56, where it joins with backwash water from the filtrate channel.

By sealing the shoe 46 (including backwash and rewash heads 48, 50) to the adjacent cell ports 16, 18 along the side wall of the tank, no rewash or backwash liquid is able to leak into the filtrate channel and, of course, positive flow control is maintained (i.e., not altered by flow in either direction through the sealing shoe). This is significant in that it is essential that bacteria and virus often found in the filtrate immediately after a backwash operation is removed during rewash without concern for contamination of the water in the filtrate channel.

In an operation where backwash and rewash are carried out sequentially, rewash liquid flowing out of the pump is transferred to waste via conduits 58, 64 and rewash valve 66, with valve 60 closed. In those systems, on the other hand, where backwash and rewash are carried out simultaneously on adjacent cells, some portion of the rewash liquid from cell port 28 of cell 16 and rewash head 50 is utilized as backwash liquid in cell 18 via conduits 56, 58 and backwash valve 60, with rewash valve 66 closed (or partially open depending on the desired rate of flow of backwash liquid). Thus, the degree of backwash water obtained from the filtrate channel and rewash head 50 is controlled by backwash supply valve 54, while the rate of backwash flow is set by a position switch on the backwash valve 60. The rate of rewash flow, on the other hand, is set by a position switch on the rewash valve 66. Backwash and rewash flow rates must be maintained within a given range. Too little a flow and the filter cell media will not fluidize and the particulate material will not be removed. Too high a flow, on the other hand, will cause the filter media to be washed out of the cell. At the same time, too much rewash flow will compact the filter bed or cause hydraulic channeling while too little rewash flow will not adequately wash the media. Further in this regard, the rewash cycle may require more time than the backwash cycle. To accommodate this differential, the valve 60 may be closed following backwash, and the rewash liquid is then diverted around the backwash head 48 via conduit 64 and valve 66. This rewash liquid may be recycled to the influent channel or to waste. Thus, upon completion of backwash, the filtrate from the simultaneously rewashed and previously backwashed cell will continue to be discharged for a predetermined time by the backwash pump, before resumption of normal filtration.

Figure 2:
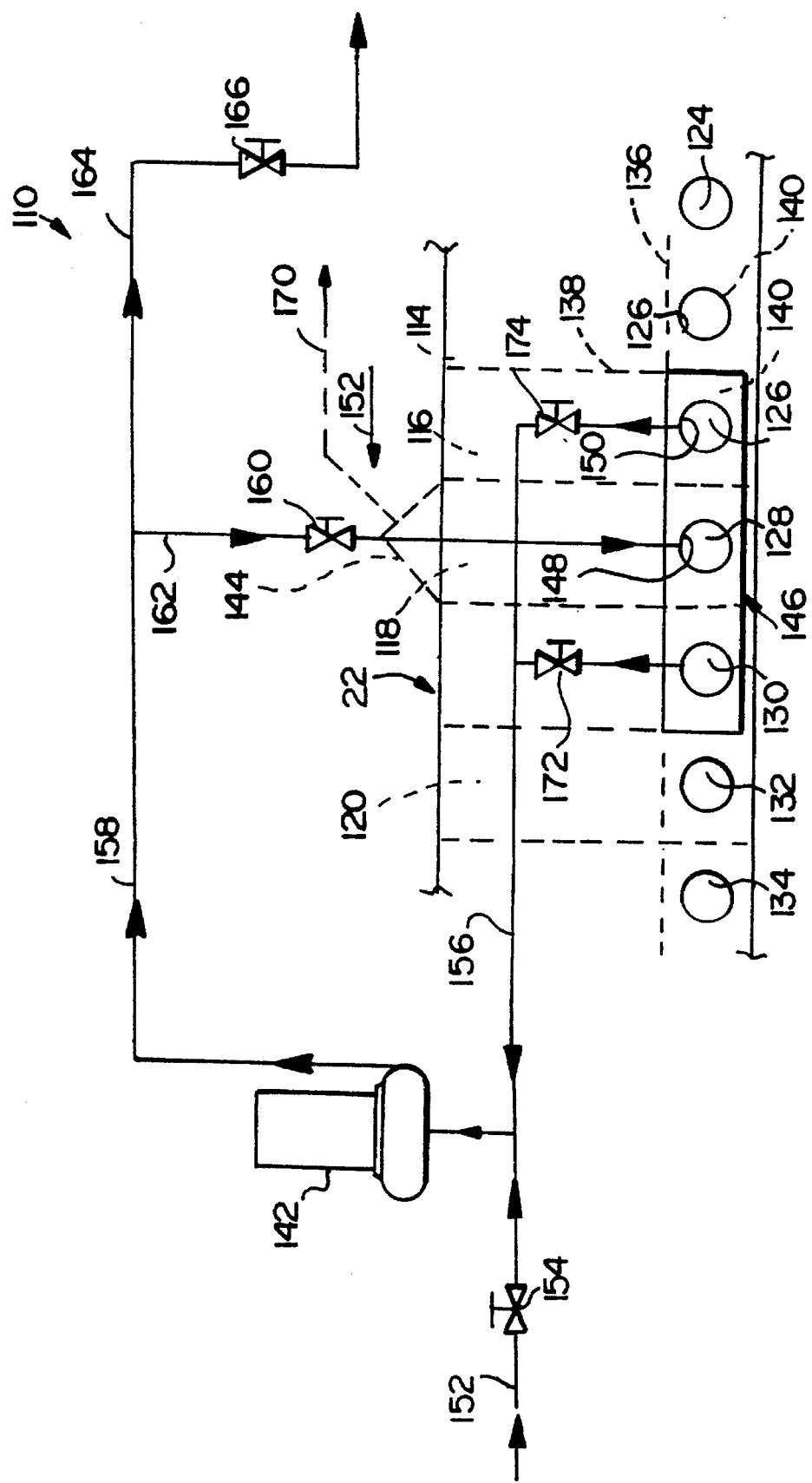
FIG. 2 is a schematic diagram illustrating a bi-directional backwash/rewash system in accordance with an alternative embodiment of the invention and FIG. 3 is a partial side view in schematic form illustrating the side mounted filtrate channel common to the various filter cells.
Figure 3:
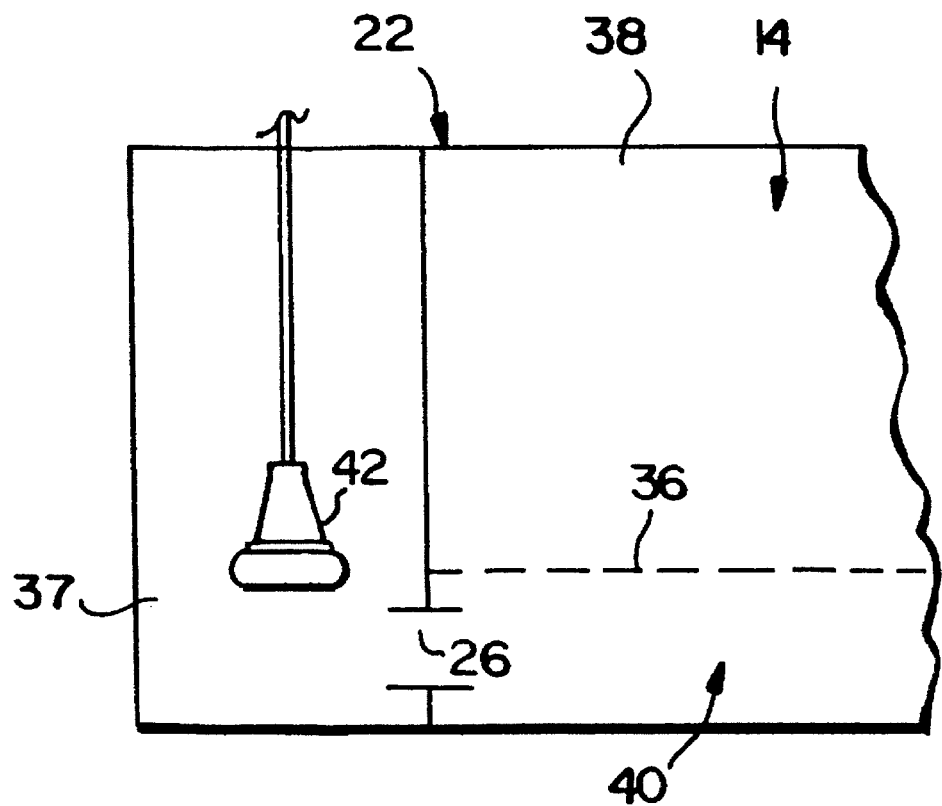

Turning to FIG. 2, similar reference numerals are utilized to designate corresponding components, but with a prime designation added. In this second exemplary embodiment, the sealing shoe 46' includes a backwash head 48' flanked on either side by rewash heads 50' and 51'. It will be understood that this arrangement permits the backwash/rewash operation as described in connection with FIG. 1, to be carried out with the traveling bridge moving in either of two opposite directions, as indicated by arrow 32'. The operation is otherwise identical to that described above for FIG. 1, with additional valves 172, 174 controlling rewash, depending on the direction of movement of the bridge.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cleaning a plurality of side-by-side gravity flow filter cells in a filtration tank, each having an outlet port in communication with a filtrate channel common to all of said cells comprising the steps of subjecting each cell, sequentially, to a backwashing operation and then a rewashing operation utilizing a backwash/rewash shoe having adjacent backwash and rewash heads, said shoe slidably movable along said cells and sequentially and sealingly engageable with respective pairs of outlet ports wherein, during backwashing, a backwash pump causes backwash liquid to flow through said backwash head and a first of said filter cell ports and then upwardly through a first of said cells in a direction opposite to a normal filtration flow direction; and during backwashing of a second adjacent cell, simultaneously rewashing said first cell with rewash liquid drawn downwardly through said first cell in the normal filtration flow direction through said rewash head, and then to said backwash pump, utilizing at least a portion of the rewash liquid from said first filter cell as backwash liquid in said second cell.

2. The method of claim 1 wherein, for said first of said plurality of cells, all backwash liquid is drawn from said filtrate channel.

3. The method of claim 1 wherein a major portion of said backwash liquid is drawn from said filtrate channel.

4. The method of claim 1 including the step of providing a backwash supply valve in between said filtrate channel and an inlet to a backwash pump.

5. The method of claim 4 including the step of providing a backwash valve operatively between an outlet of the backwash pump and said backwash head of said backwash/rewash head.

6. The method of claim 5 including the step of providing a conduit between said head and said inlet of said backwash pump, 7. The method of claim 6 including the step of providing a rewash isolation valve in said conduit between said rewash head and said backwash pump.

8. The method of claim 7 including the step of providing a rewash valve in a rewash conduit in communication with said outlet of said backwash pump and which bypasses said backwash valve.

9. The method of claim 1 including the steps of terminating backwash prior to terminating rewash and diverting rewash liquid downstream of said backwash pump away from said backwash head.

10. An apparatus for cleaning a filtration tank having a plurality of side-by-side gravity flow filter cells defined in part by a tank wall, each cell having an outlet port in said tank wall in communication with a filtrate channel common to all of said cells, by subjecting each cell sequentially to a backwashing operation and then a rewashing operation, the apparatus comprising a backwash pump utilized to pump backwash liquid through a first of said filter chamber ports to flow upwardly through a first of said cells in a direction opposite to a normal filtration flow direction; and a slidably movable shoe incorporating a backwash head and a laterally adjacent rewash head each movable into respective sealing engagement with a pair of adjacent outlet ports with said rewash head in fluid communication with an inlet of said backwash pump, and said backwash head is in fluid communication with an outlet of said backwash pump.

11. Apparatus according to claim 10 wherein a backwash valve is located in a first conduit connecting the backwash pump outlet to the backwash head to thereby control backwash liquid rate of flow, and a backwash supply valve is located adjacent said inlet to said backwash pump for controlling flow of filtrate to said suction pump.

12. Apparatus according to claim 11 wherein a rewash valve is located in a second conduit connected with said first conduit.

13. Apparatus according to claim 10 wherein said backwash pump is carried by a traveling bridge mounted above said tank for movement along said plurality of cells, said pump suspended from said bridge and located within said filtrate channel.

14. Apparatus according to claim 10 including means for combining rewash liquid and liquid from said filtrate channel or backwash liquid for any given cell located after said first of said plurality of cells.

15. Apparatus according to claim 14 including means for diverting rewash liquid away from said backwash head when backwash terminates before rewash.

16. An apparatus for cleaning a filtration tank having a plurality of side-by-side gravity flow filter cells defined in part by a tank wall, each cell having an outlet port in said tank wall in communication with a filtrate channel common to all of said cells, by subjecting each cell sequentially to a backwashing operation and then a rewashing operation, the apparatus comprising a backwash pump utilized to pump backwash liquid through a first of said filter chamber ports to flow upwardly through a first of said cells in a direction opposite to a normal filtration flow direction; and a slidably movable shoe incorporating a backwash head and a laterally adjacent rewash head each movable into respective sealing engagement with a pair of adjacent outlet ports, said shoe being in continuous sealing engagement with said tank wall during said backwashing and rewashing operations; and wherein during backwash of one cell and simultaneous rewash of an adjacent cell, a conduit connected to said rewash head is arranged to supply rewash liquid to the adjacent cell for backwash.

\* \* \* \* \*